United States Patent
Santander et al.

(10) Patent No.: US 6,477,763 B1
(45) Date of Patent: *Nov. 12, 2002

(54) METHOD FOR MAKING A WIRE-WOUND ROTATING PART FOR AN ELECTRICALLY DRIVEN MACHINE

(75) Inventors: Eduardo Santander, Vitry-sur Seine (FR); Jean-Michel Pigeau, Bretigny sur Orge (FR); Dominique Templer, Plaisir (FR); Pierre-François Desesquelles, L'Hay les Roses (FR)

(73) Assignee: Valeo Systemes d'Essuyage, La Vierriere (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/945,584

(22) PCT Filed: Feb. 25, 1997

(86) PCT No.: PCT/FR97/00333

§ 371 (c)(1),
(2), (4) Date: Jan. 12, 1998

(87) PCT Pub. No.: WO97/32387

PCT Pub. Date: Sep. 4, 1997

(30) Foreign Application Priority Data

Feb. 28, 1996 (FR) .............................. 96 02465

(51) Int. Cl.[7] ...................... H01R 43/06; H02K 15/12; H02K 1/22

(52) U.S. Cl. ............... 29/597; 29/596; 29/598; 29/605; 29/606; 310/261; 310/270; 310/42; 310/234; 156/172; 156/275.5; 264/272.2

(58) Field of Search .................. 29/596, 597, 598, 29/605, 606, 564.5, 732, 735, 736; 310/261, 270, 42, 234; 264/272.19, 272.2; 100/35; 156/172, 273.9, 275.5, 274.2; 411/542, 546

(56) References Cited

U.S. PATENT DOCUMENTS

| 677,392 A | * | 7/1901 | Anderson ................... 310/270 |
| 2,949,555 A | * | 8/1960 | Paul ........................... 156/172 |
| 3,519,863 A | * | 7/1970 | Ambler et al. ................ 29/597 |

(List continued on next page.)

FOREIGN PATENT DOCUMENTS

| DE | 10 10 624 | | 6/1957 |
| DE | 1010624 | * | 6/1957 |
| DE | 22 30 713 | | 1/1974 |
| DE | 89 08 910 | | 12/1993 |
| DE | 43 41 354 | | 6/1995 |

OTHER PUBLICATIONS

English Translation of German Patent Publication, DE-1010624.*

(List continued on next page.)

*Primary Examiner*—Peter Vo
*Assistant Examiner*—A. Dexter Tugbang
(74) *Attorney, Agent, or Firm*—Morgan & Finnegan, LLP (57) ABSTRACT

A method for making a wire-wound rotating part for an electrically driven machine, wherein a sheet metal pack and a commutator spaced therefrom are attached to a shaft, and conductive strands are wound around the sheet pack and the commutator to form a generally ring shaped winding. The method further comprises axially compressing the winding and simultaneously moving the commutator closer to the sheet pack. The method is particularly useful for making electric fans for motor vehicles.

14 Claims, 7 Drawing Sheets

U.S. PATENT DOCUMENTS

| | | | | | |
|---|---|---|---|---|---|
| 3,713,208 | A | * | 1/1973 | Doyle | 29/597 |
| 3,798,763 | A | * | 3/1974 | Deltoer | 29/597 |
| 4,663,835 | A | * | 5/1987 | Caillier | 29/598 |
| 4,983,866 | A | * | 1/1991 | Lok | 29/597 |
| 4,992,488 | A | * | 2/1991 | Ruf | 29/597 |
| 5,084,955 | A | * | 2/1992 | Yamasaki et al. | 29/605 |
| 5,105,531 | A | * | 4/1992 | Sawada et al. | 29/605 |
| 5,121,017 | A | * | 6/1992 | Yamamoto et al. | 29/596 |
| 5,467,521 | A | * | 11/1995 | Nakamura et al. | 29/598 |
| 5,488,260 | A | * | 1/1996 | Heyraud | 310/42 |
| 5,572,787 | A | * | 11/1996 | Cardini et al. | 29/598 |
| 5,740,600 | A | * | 4/1998 | Rasberry | 29/605 |

OTHER PUBLICATIONS

Patents Abstracts of Japan vol. 004, No. 112 (E–0210), Aug. 12, 1980 & JP 55 068850 (Matsushita Electric Ind Co Ltd) May 23, 1980.

Patents Abstracts of Japan vol. 003, No. 146 (E–156), Dec. 4, 1979 & JP 54 125414 A (Matsushita Electric Ind Co Ltd), Sep. 28, 1979.

Patent Abstracts of Japan vol. 012, No. 080 (E–590), Mar. 12, 1988 & JP 62 217842 (Kokusan Denki Co Ltd), Sep. 25, 1987.

Patent Abstracts of Japan vol. 017, No. 071 (E–1319), Feb. 12, 1993 & JAP 04 275050 (Fujitsu General Ltd), Sep. 30, 1992.

* cited by examiner

METHOD FOR MAKING A WIRE-WOUND ROTATING PART FOR AN ELECTRICALLY DRIVEN MACHINE

FIELD OF THE INVENTION

The invention relates to a rotating part of an electrically driven machine, a direct-current motor for a motor vehicle comprising such a rotating part and a method for making such a rotating part.

BACKGROUND OF THE INVENTION

Direct-current motors for electric fans in motor vehicles are known which comprise an inductor with permanent magnets and a wire-wound armature. This armature has a support and a generally ring-shaped winding formed of strands wound around the support. The circulation of a current in the strands placed in the magnetic field generated by the inductor gives rise to a Laplace force in the strands which causes the rotation of the armature around its axis. The strands comprise rectilinear sections, parallel to the axis of the armature, and at the end thereof intermediate sections connected to the commutator or to another rectilinear section. The Laplace force essentially occurs only in the rectilinear sections.

The inactive intermediate sections are disposed and fitted together at the axial end faces of the winding to occupy a reduced space. These thus form bulges called armature leading-out wires. The spatial requirement of the leading-out wires in the axial direction of the motor is large, and may be equal to the length of the active rectilinear sections. The axial spatial requirement of the motor itself therefore depends to a great extent on the axial spatial requirement of the leading-out wires. In the motor industry, inter alia, there is today an increasing demand for motors having a reduced axial spatial requirement.

Moreover, the dimension of the winding in the axial direction, which is large, is matched with a tolerance range which is itself large. It follows that the parts of a motor adjacent to the winding occupy positions which take this tolerance range into consideration. The axial spatial requirement of the motor is therefore doubly increased.

Furthermore, the volumetric distribution of the strands parallel to the axes and of the leading-out wires is generally irregular. This poor distribution creates a weight imbalance or mass imbalance, which it is necessary to compensate by rebalancing the armature after production before mounting in the motor. This compensation forms an operation which becomes increasingly delicate as the initial lack of balance increases.

One problem is therefore of providing a method for producing a wire-wound rotating part having leading-out wires which have a reduced axial dimension and a reduced tolerance range associated with this dimension, and distributed more regularly than the leading-out wires of the above-mentioned rotating parts.

From the prior art, particularly the English translation of the abstract of the Japanese patent JP-4 275 050 (Fujitsu General Ltd), the production of a wound stator having a reduced axial dimension is known by winding the strands onto the sheet metal pack, then disposing the sheet metal pack with its winding in a press comprising two clamping jaws having opposite coaxial annular compression faces. The first clamping jaw has a core onto which the sheet metal pack with its winding is threaded. When the press is closed, the end of the core penetrates into a cavity of the second clamping jaw intended for this purpose. Then the two clamping jaws are brought closer to one another to perform the axial compression of the winding.

Thus, the compression force causes the crushing of the leading-out wires in the axial direction and brings about a great reduction in the axial spatial requirement of the winding.

However it is known that to produce the wire-wound rotating part of an electrically driven machine, it is advantageous to proceed as follows:

attach a bare sheet metal pack onto a shaft;

then fix a commutator onto the shaft in a temporary position spaced from the sheet metal pack;

then wind the strands simultaneously onto the sheet metal pack and the commutator; and finally bring the commutator closer to the sheet metal pack to place it in its permanent position.

This method facilitates the production of the winding. The teaching of the abstract of the above-mentioned Japanese document cannot be used in these conditions, as it relates to a winding of a fixed part of an electrically driven machine which is provided with neither a shaft nor a commutator.

One object of the invention is to propose a method for producing a rotating part of an electrically driven machine enabling the winding to be produced simultaneously on the sheet metal pack and on the commutator in the temporary position before placing the commutator in the permanent position, whilst obtaining the above-mentioned advantages of the axial compression of the winding.

SUMMARY OF THE INVENTION

With a view to the achievement of this object, according to the invention there is specified a method for producing a wire-wound rotating part for an electrically driven machine, including stages consisting of:

attaching a sheet metal pack and a commutator onto a shaft, the commutator being spaced from the sheet metal pack; and winding conductive strands onto the sheet metal pack and the commutator to form a generally ring-shaped winding, the method also including the step consisting simultaneously of compressing the winding in an axial direction of the winding, and bringing the commutator closer to the sheet metal pack.

Thus, the temporary position of the commutator facilitates the production of the winding on the commutator and sheet metal pack. Moreover all the advantages of the axial compression of the winding are obtained. Furthermore, certain strands have an end connected to the commutator and another end connected to the axial end face of the winding directed towards the commutator. During the axial compression of the winding simultaneously with the displacement of the commutator, the two ends of these strands are displaced in the same direction in the axial direction of the shaft. Consequently, between these two ends no traction occurs which is likely to alter or break the strand, and the excess of strands adjacent to the commutator does not produce any masses from which short circuits could result. The risk of contact, or shocks, between the strands is reduced. This method generally enables the deterioration of the insulating sheath or of the insulating varnish of the strands to be avoided to a great extent during compression, which deterioration could in the opposite case cause short circuits between the strands. In particular, the crushing of the strands which could cause the cutting of some of them is avoided.

The method advantageously includes during compression the phase consisting of guiding strand sections extending from the commutator to the sheet metal pack.

Thus the above-mentioned drawbacks are further avoided, for the strands adjacent to the commutator, i.e. the formation of masses, their crushing or their excessive traction, from which a contrario the alteration of the insulating material of the strands and short circuits between them could result.

The guiding phase advantageously includes the operation consisting of keeping each of the said strand sections in a fixed radial plane determined in relation to the shaft.

It involves a particularly simple manner of producing this guidance.

Conductive strands having an outer sheath made of thermosetting material are advantageously wound onto the support, and during the compression stage the winding is heated to a temperature at least equal to the setting temperature of this material.

Thus the strands are immobilised in the compression position of the winding. Therefore the service life of the obtained arrangement of the strands is prolonged.

The winding is advantageously heated by circulating electric current in the strands.

Thus it is not necessary to use a press equipped with its own heating means.

Before the compression stage, a hot liquid substance which can harden on cooling is advantageously applied onto the strands, and the compression stage is extended until the cooling of the substance.

It involves another manner of obtaining the immobilisation of the strands in the compressed position.

The invention also relates to a press for the production of a wire-wound rotating part for an electrically driven machine, the press comprising a first clamping jaw and a second clamping jaw having respective compression faces having a general ring-shape in plan view, coaxial to one another and extending opposite one another, the press being designed to move the two clamping jaws relatively in the axial direction of the compression faces, each clamping jaw having a cavity in the centre of the compression face, with at least the first clamping jaw having a generally ring-shaped bearing face in plan view, coaxial to the compression face, having a larger diameter which is less than a smaller diameter of the compression face, and forming a base of the cavity.

This press enables the method according to the invention to be used. This press may ensure in particular the compression of the winding by the direct contact of the compression faces with the axial end faces of the winding.

The cavity having the bearing face may receive the commutator, the bearing face stressing the commutator for its displacement from its temporary position to its permanent position.

The second clamping jaw advantageously has a generally ring-shaped bearing face, coaxial to the compression face, having a larger diameter which is less than that of the bearing face of the first clamping jaw and forming a base of the cavity associated with the second clamping jaw.

This cavity may receive the end of the shaft opposite the commutator. Thus, the displacement of the commutator is performed by stressing the commutator, on the one hand, and the axial end of the shaft opposite the commutator, on the other hand, towards one other in the axial direction. For the displacement of the commutator it is therefore not necessary to further stress the axial end face of the winding opposite the commutator.

At least one of the clamping jaws advantageously has at least one contoured edge which is ring-shaped in top view, prolonging the compression face and protruding therefrom towards the other clamping jaw, the edge having a contour like the sector of an ellipse or of a parabola, the compression face having a rectilinear contour touching a vertex of the ellipse or of the parabola.

During compression, this edge ensures the guidance of the peripheral strands adjacent to the axial end faces of the sheet metal pack. The ellipse-shaped or parabola-shaped contour enables this guidance to be performed by reducing as far as possible the risks of crushing the strands.

The edge is advantageously prolonged by another curved contour, the junction between the two contours forming a point of inflection.

Thus, one can avoid producing a protruding edge at the end of the guide contour.

The press advantageously comprises stop means designed to limit the relative displacement of the clamping jaws towards one another to prevent the relative moving together of the compression faces within a predetermined distance.

Thus any excessive compression of the winding is prevented, from which an irreversible alteration of the strands could result.

The stop means advantageously comprise plane stop faces on the clamping jaws, roughly perpendicular to the axis, and designed to come into contact with one another.

The press advantageously comprises at least one series of bulges designed to be disposed in the vicinity of the cavity and protruding from a plane of the compression face of the first clamping jaw towards the second clamping jaw, the bulges being disposed roughly in a circle coaxial to the cavity, regularly around the axis.

Thus during compression these bulges ensure the guidance of the strands connected to the commutator which was involved above.

The bulges are advantageously borne by the first clamping jaw.

The press advantageously comprises a slide which can move by sliding through the first clamping jaw in relation thereto, in the axial direction, the slide bearing the bulges.

Thus the position of the bulges may be changed at will (for example to make the bulges protrude more or less) during the various compression phases and/or as a function of the configuration of the produced rotating part.

At the least the compression faces are produced from steel, these faces having undergone a superficial treatment such as case hardening, nitride hardening or carbonitriding.

In fact it is advantageous for the clamping jaws to have a certain superficial hardness, for example 55 to 60 HRC (Rockwell) and also good sliding properties, and also a good surface state, to avoid harming the strands during the compression.

Furthermore according to the invention there is specified a wire-wound rotating part for an electrically driven machine which was produced by means of the method specified by the invention.

Furthermore according to the invention there is specified a wire-wound rotating part for an electrically driven machine, comprising a shaft, a sheet metal pack and a commutator attached to the shaft, and a generally ring-shaped winding comprising conductive strands wound onto the sheet metal pack and commutator, the rotating part comprising at least one series of elongated pins disposed in a circle coaxial to the shaft regularly around the shaft, the pins being oriented in a direction roughly opposite to the sheet metal pack and being designed to be interposed radially between the commutator and the winding.

Thus, guide bulges of the strands adjacent to the commutator are borne by the rotating part itself, as a replacement or as a supplement to those borne by the press.

The rotating part advantageously comprises a washer threaded onto the shaft and bearing the pins.

The washer may more particularly be placed in the axial direction between the commutator and the winding, and even attached to the commutator.

The rotating part advantageously comprises an insulating plate integrated in the sheet metal pack parallel thereto and bearing the pins.

The plate may be the insulating cheek or star disposed, as is known, at each end of the sheet metal pack before the production of the winding.

The strands are advantageously glued to one another by means of a material applied to the strands.

It advantageously relates to a direct-current motor armature for a motor vehicle.

It advantageously relates to an armature for an electric fan.

Furthermore in accordance with the invention a direct-current motor for a motor vehicle comprising a rotating part as specified by the invention is specified.

BRIEF DESCRIPTION OF THE FIGURE

Other characteristics and advantages of the invention will also become apparent in the following description of a preferred embodiment and of refinements given by way of non-restrictive examples. In the attached drawings.

DETAILED DESCRIPTION OF THE PREFERRED EMBODIMENTS

Figure 1:
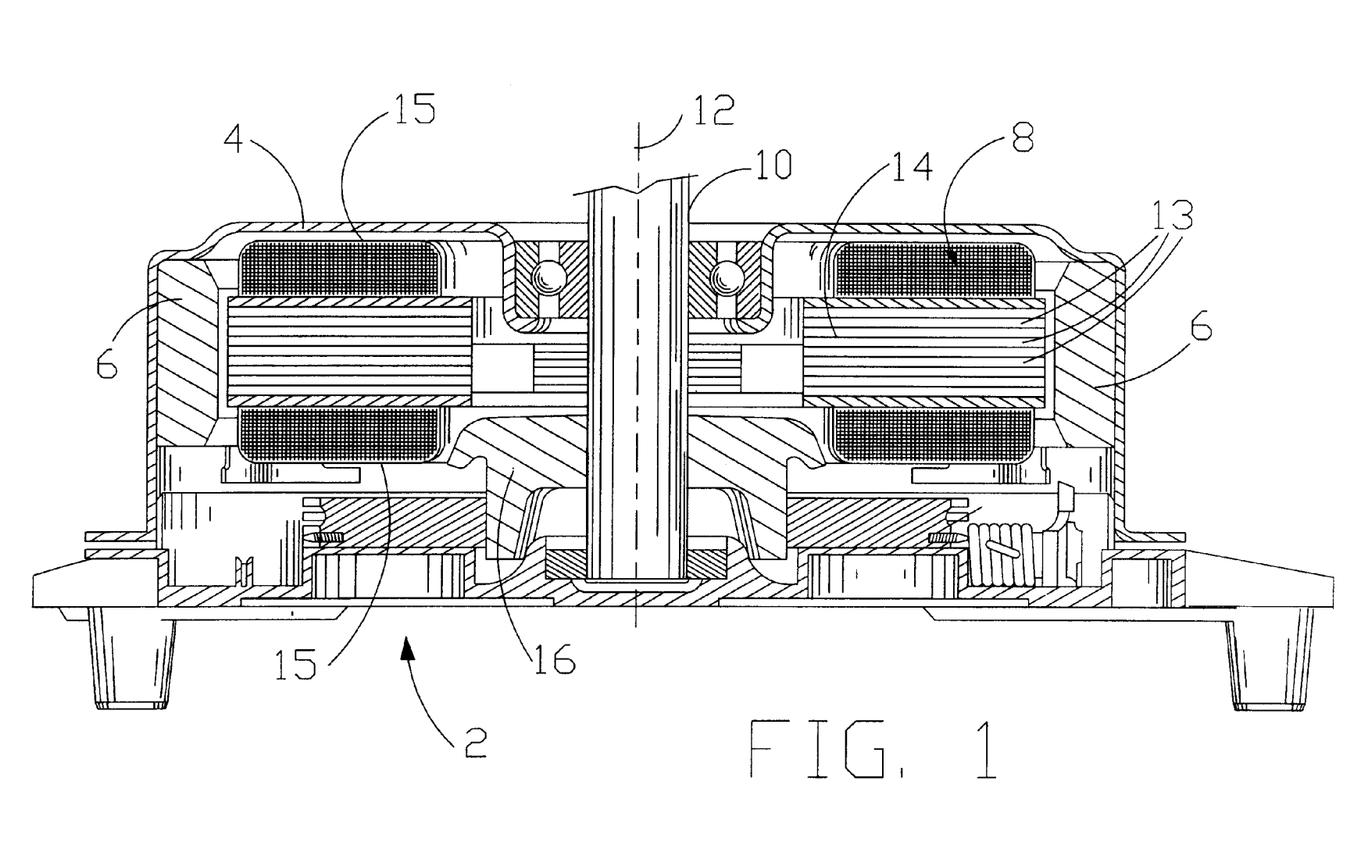
FIG. 1 is a view in axial section of a motor comprising an armature according to a preferred embodiment of the invention.

FIG. 1 presents a direct-current motor 2 of an electric fan for a motor vehicle. This motor comprises a fixed casing 4 and permanent magnets 6 attached internally to the casing, the casing and the magnets forming an inductor of the motor. The motor also comprises an armature 8 according to the invention forming the rotating part of the motor. The armature 8 is produced according to the method which will be described below.

Figure 2:
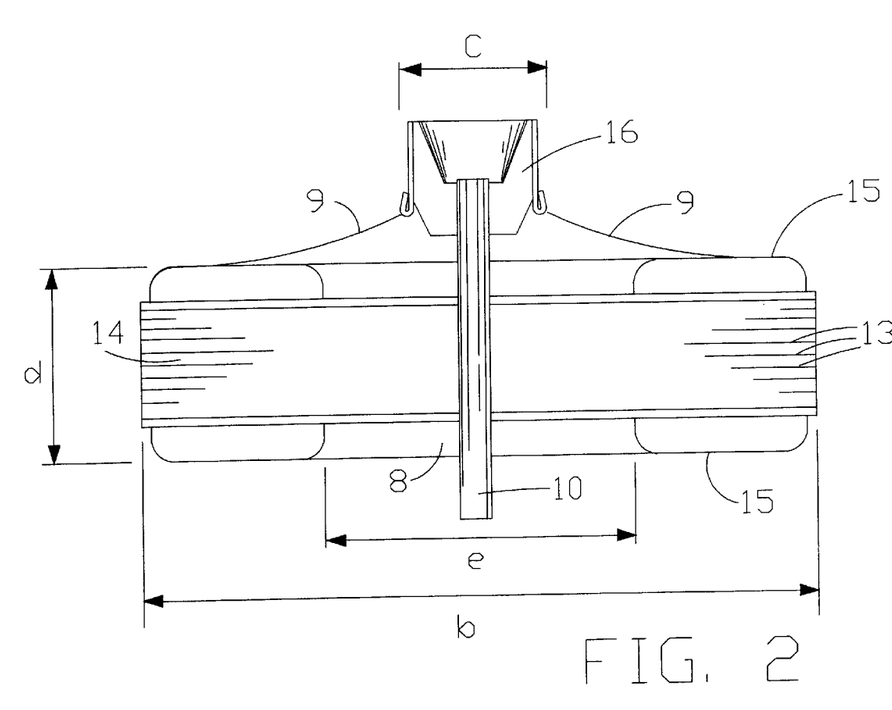
FIGS. 2 and 3 are views in axial section of the rotating part of FIG. 1 during production showing two stages of the utilisation of the method according to a preferred embodiment of the invention.

With particular reference to FIGS. 1 and 2, an armature support 14 is produced by disposing generally circular sheets 13 parallel to one another, concentrically against another. Thus a generally axially cylindrical sheet metal pack 12 is formed. These sheets have outer radial openings forming, by the fitting together of the sheets, recesses (not represented) having a base parallel to the axis 12 of the cylinder. To the sheet metal pack is attached a shaft 10 passing through the sheet metal pack along its axis 12, and to the shaft 12 is attached a commutator 16 in a temporary position spaced from the sheet metal pack, as on FIG. 2.

Then strands 9 are wound onto the sheet metal pack and the commutator 16 so as to produce a generally ring-shaped armature winding. Each strand 9 comprises a copper wire and an insulating sheath covering the wire. The strands 9 are more particularly engaged in the radial recesses of the sheet metal pack. The strands thus comprise rectilinear sections parallel to the axis 12, extending into the recesses and intended to cause the rotation of the armature when a current passes through the strand, under the field effect created by the inductor. The strands 9 also comprise curved inactive sections, extending to the ends of the active rectilinear sections, and linking the rectilinear sections to one another, or to the commutator, or forming ends of the strands. The curved inactive sections are assembled and entwined to form armature leading-out wires defining two opposite axial end faces 15 of the winding. On each end face, the leading-out wires have a generally ring-shaped arrangement of axis 12. Some of the strands 9 have a first end fixed to the commutator 16, for example by welding, and a second end fixed to an axial end face 15 of the winding directed towards the commutator 16.

A following step of the method uses a press according to the invention such as that in FIGS. 4 to 7.

The press comprises a first clamping jaw 23 and a second clamping jaw 24 made of steel. The first clamping jaw 23 has a plane compression face 28 which is generally ring-shaped in plan view, having a rectilinear contour. The clamping jaw 23 has two edges 30, an outer and an inner edge respectively adjacent to the outer and inner circumferences of the compression face 28. Each edge 30 is generally ring-shaped in plan view and has a curved contour having two contour zones 30a, 30b, having curves directed in opposite directions, as can be seen on FIG. 5. The first contour zone 30a has the general shape of a sector of an ellipse or of a parabola. This zone 30a is disposed so that the rectilinear contour of the compression face 28 touches the parabola or the ellipse at a vertex S thereof, if necessary, the vertex of the ellipse being here regarded as an end of the major axis of the ellipse. Thus the first contour zone 30a by one end prolongs the rectilinear contour of the compression face 28. The second contour zone 30b extends in the prolongation of the other end of the first contour zone 30a, the junction between the two contour zones being formed by a point of inflection I. The second contour zone 30b is also shaped as a sector of an ellipse or of a parabola. When the first or the second contour zone is shaped as a sector of an ellipse, this sector is less than or equal to one quarter the circumference of the ellipse.

The first clamping jaw 23 has a cylindrical lateral face 34 extending from the other end of the second contour zone 30b associated with the outer edge 30. The cylindrical face 34 is coaxial to the compression face 28 and parallel to its axis. The first clamping jaw 23 has a plane annular stop face 36 parallel to the compression face 28, extending from the cylindrical lateral face 34, towards the exterior of the jaw, whilst being locally perpendicular to this cylindrical face 34. The first clamping jaw 23 has a central cylindrical face 38 coaxial to the compression face 28, parallel to its axis and defining a cavity 39 in the centre of compression face. The junction between the cylindrical face 38 and the inner edge 30 is formed by a rounded contour. The inner edge 30 extends protruding from the plane of the compression face 28 of this clamping jaw, in the direction of the other clamping jaw 24. The first clamping jaw 23 has a plane ring-shaped bearing face 40, parallel and coaxial to the compression face 28, adjacent to the central cylindrical face 38, having a larger diameter, or external diameter, which is less than the diameter of the internal circumference of the compression face 28 (or smaller diameter thereof) defining a base of the cavity 39.

For the preceding characteristics, the second clamping jaw 24 is identical in shape and in dimensions to the first clamping jaw 23.

The first clamping jaw 23 also has a cylindrical conduit 42 extending from the base 40 of the cavity 39, coaxially to the compression face 28. The second clamping jaw 24 in turn has a blind counterbore 44 extending from the base 40 of the associated cavity, coaxially to the compression face 28. In particular, the blind counterbore 44 has a ring-shaped bottom face 45, preferably disc-shaped, having a larger diameter which is less than that of the base 40 of the cavity 39 of the first clamping jaw 23.

The two clamping jaws 23, 24 are disposed with their compression faces 28 coaxial, opposite one another and spaced from one another.

The press comprises conventional means known per se such as jacks designed to displace one of the clamping jaws, for example the first clamping jaw 23, parallel to the axial direction in relation to the other jaw, for example the second fixed clamping jaw 24. The two stop faces 36 of the clamping jaws are designed to come into contact with one another to form stop means which limit the relative displacement of the clamping jaws towards one another to prevent the relative bringing together of the compression faces 28 within a predetermined distance.

Figure 6:
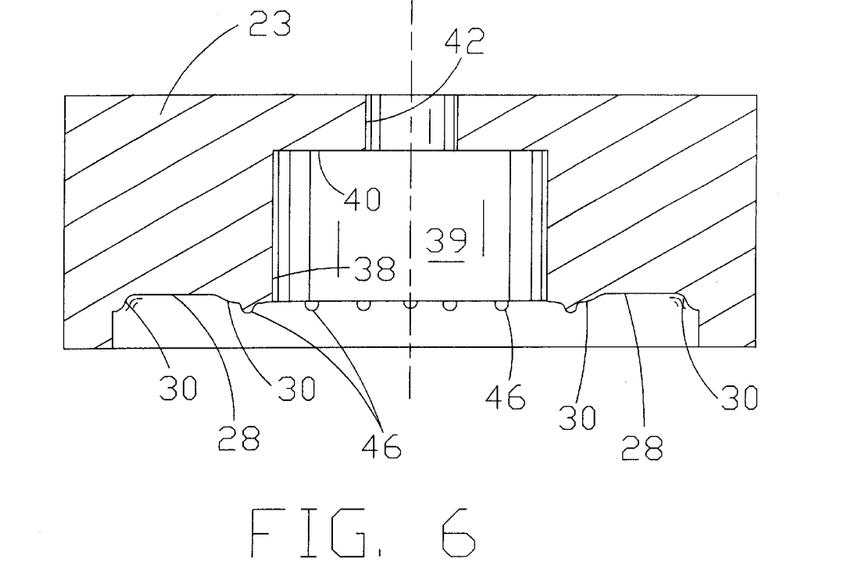
FIG. 6 is a detailed sectional view similar to FIG. 4, showing the first clamping jaw only.
Figure 7:
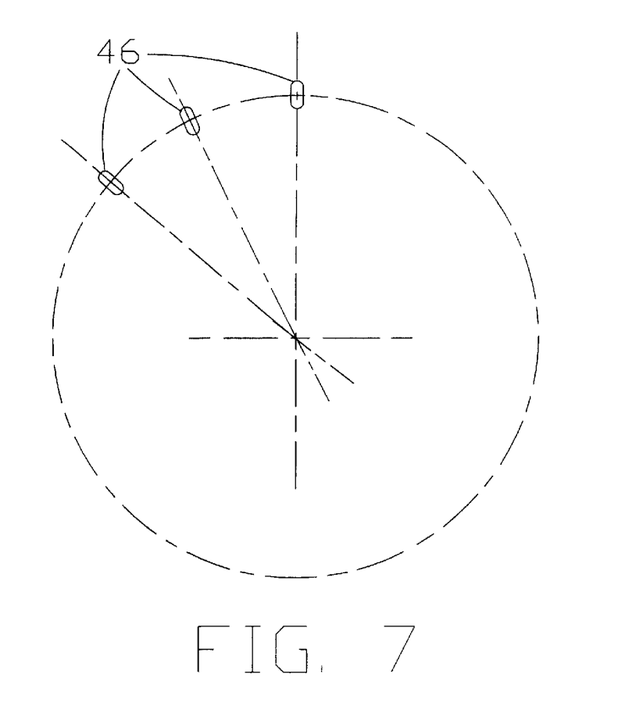
FIG. 7 is an underneath view of the clamping jaw of FIG. 6 showing just the arrangement of the bulges.

With reference to FIGS. 6 and 7, the inner edge 30 of the first clamping jaw 23 comprises a series of elongated bulges 46, having rounded contours and extending projecting from this edge towards the second clamping jaw 24, in the vicinity of the cavity 39. The bulges 46 are disposed roughly in a circle coaxial to the compression face 28, regularly around the axis. The direction of elongation of the bulges 46 is radial to the axis.

All the above-mentioned faces of the clamping jaws have undergone a surface treatment such as case hardening, nitride hardening or carbonitriding, with a view to endowing them with great hardness, for example 55 to 60 HRC (Rockwell) and a good surface quality.

The press is used in the following manner.

With the press open and the first clamping jaw 23 spaced from the second clamping jaw 24, the wire-wound rotating part is placed in the press so that it us is situated at the end of the winding stage. For this, the rotating part is placed in the press and coaxially thereto.

The end of the shaft the furthest from the commutator 16 is housed in the blind counterbore 44 of the second clamping jaw 24, the winding resting by its lower axial end face 15 on the compression face 28 of the second clamping jaw 24. When the press is then closed again, the commutator 16 occupies the cavity 39 of the first clamping jaw 23, at a distance from the base 40 thereof, the shaft end adjacent to the commutator 16 extending into the conduit 42 of the first clamping jaw. The stop faces 36 of the clamping jaws are spaced from one another. The compression face 28 of the first clamping jaw 23 is in contact with the upper axial end face 15 of the winding.

Then the press is actuated. The first clamping jaw 23 moves closer to the second clamping jaw 24 by sliding, the compression faces 28 producing the compression or compacting of the winding directly on the axial end faces 15 of the winding which are stressed in the axial direction towards one another.

Figure 5:
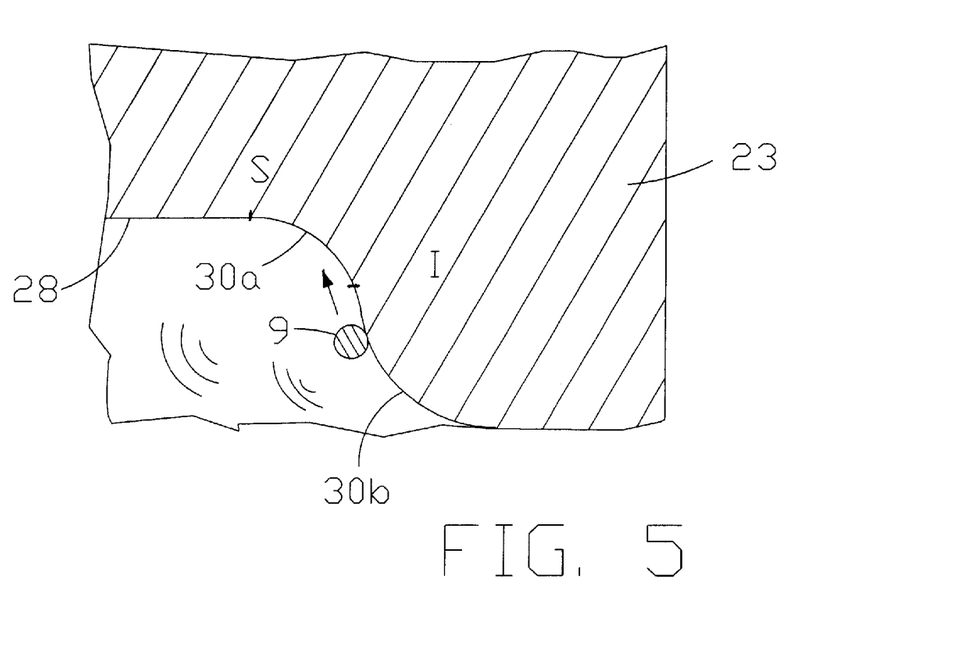
FIG. 5 is a partial view on an enlarged scale of detail D of FIG. 4, showing the first clamping jaw only.

During this axial compression, the strands 9 extending at the periphery of the winding in the vicinity of the axial end faces 15 come into contact with the outer and inner edges 30 of the clamping jaws, as on FIG. 5. Thanks to the above-mentioned shape of the contour of these edges, the strands coming into contact with these edges are guided along the edges in the direction of the axis of the clamping jaws. These edges 30 thus ensure a compression or compacting of the axial end faces 15 of the winding in the radial direction, in the direction of the axis. This radial compression is performed without altering the strands.

At the same time as the compression of the winding occurs, the base 40 of the cavity of the first clamping jaw 23 comes to rest in the axial direction against the upper face of the commutator 16 and stresses it towards the sheet metal pack. The base 45 of the blind counterbore 44 of the second clamping jaw 24 stresses the end of the shaft opposite the commutator in the axial direction, in the opposite direction. The moving together of the clamping jaws brings about the displacement of the commutator 16 along the shaft to a permanent position closer to the sheet metal pack than the previous temporary position.

At the same time as this compression of the winding and this displacement of the commutator, the strands 9, which have one end connected to the commutator 16 and one end connected to the axial end face 15 of the winding adjacent to the commutator, come into contact with the bulges 46 and are inserted between the bulges 46 as the first clamping jaw 23 draws closer to the second clamping jaw 24. During the entire sequence of this moving together, these strands remain between the bulges 46 and are thus each held and guided in a determined fixed plane radial to the shaft of the rotating part. Thus clusters, shocks between strands and the crushing of said strands are avoided, these strands having a slack configuration after winding and before compression. The inner edge 30 of the first clamping jaw enables the strands adjacent to the commutator to be tightened.

Figure 3:
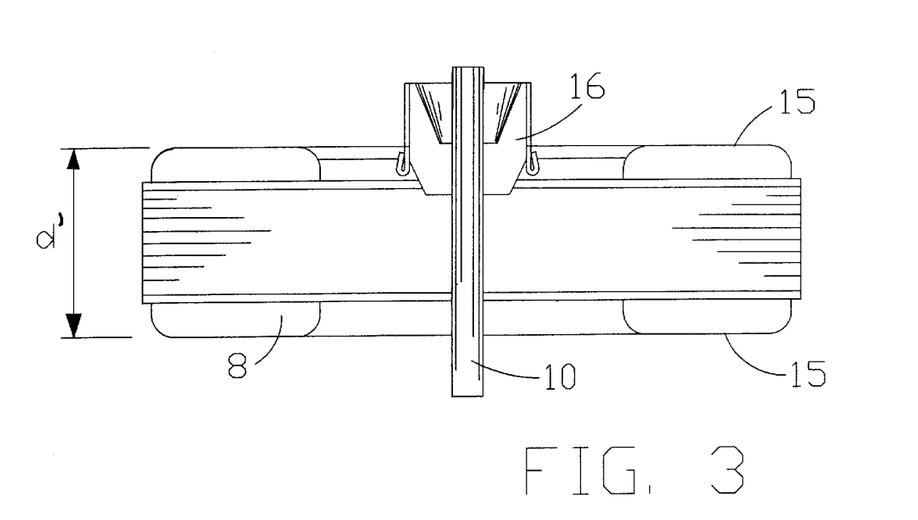
Figure 4:
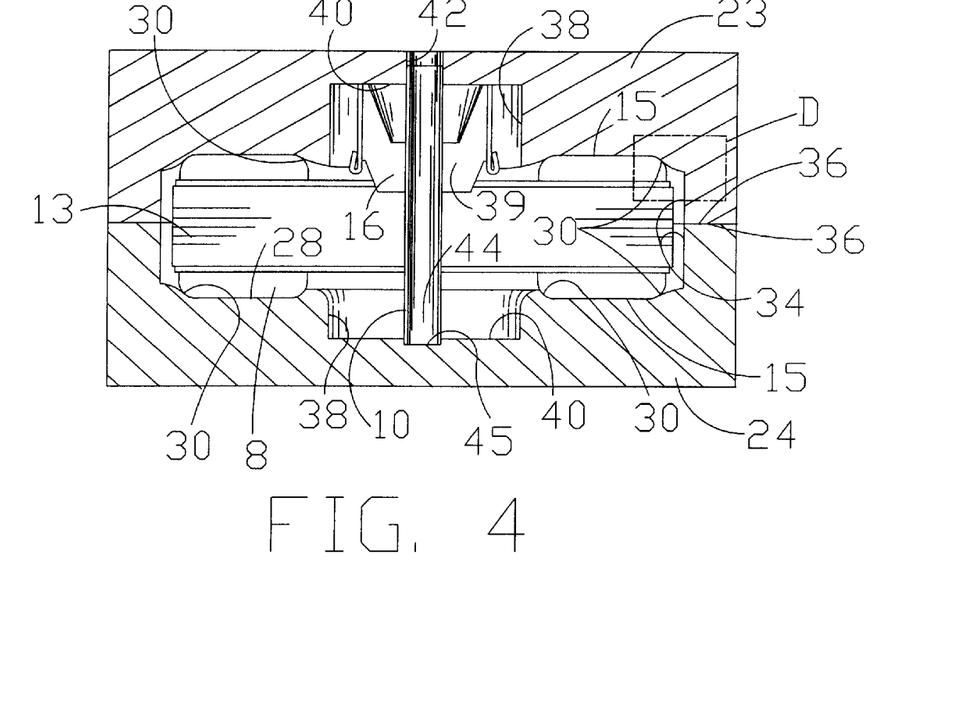
FIG. 4 is a principle view in axial section of a press according to the invention for the utilisation of the method of FIGS. 2 and 3.

At the end of the compression, the press is opened and the first clamping jaw is again moved away from the second clamping jaw. The rotating part is removed. With reference to FIG. 3, the winding has axial end faces 15 which are substantially plane. The edge zones of these faces have a male shape complementary to the female shape of the outer and inner edges 30 of the clamping jaws.

Figure 8:
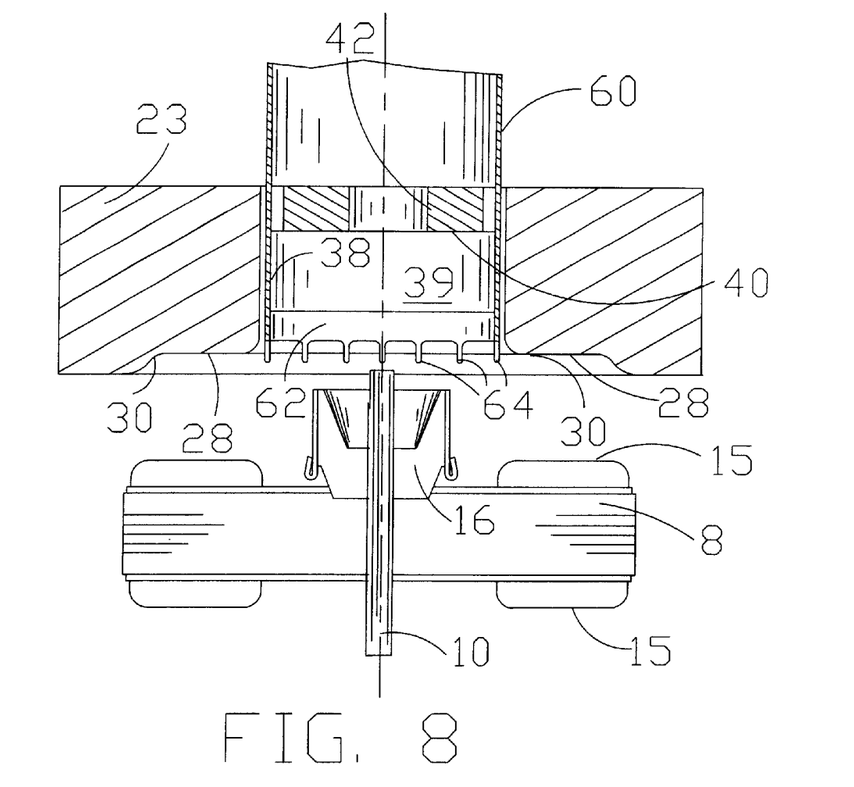
FIG. 8 is a view similar to FIG. 6, of the first clamping jaw and of the rotating part, showing a first refinement.

In a refinement represented in FIG. 8, the press comprises a slide 60 which can move by sliding in the axial direction, in relation to the first clamping jaw 23 and through it. The slide 60 comprises a crown 62 having a series of bulges 64 disposed regularly over a circle coaxial to the axis and inscribed in a plane perpendicular to the axis. The slide 60 is designed to be moved so that the bulges 64 can occupy a position in which they extend protruding from the inner edge 30 of the first clamping jaw 23 towards the second clamping jaw 24, and a position in which they are on the contrary pushed back in relation to the plane of the compression face 28 of the first clamping jaw. The slide 60 is for example designed so that the bulges 64 are movable in the cavity 39 of the first clamping jaw 23, the bulges being adjacent to the central cylindrical face 38.

This press may for example be used in the following manner. When the rotating part is positioned in the press, the bulges 64 are in the pushed back position. When the press is closed, the slide 60 moves to dispose the bulges 64 protruding from the edge 30 as mentioned above, which position the bulges retain during compression to ensure the guidance of the strands 9 as described previously for the bulges attached to the edge. Before opening the press, the slide 60 moves away from the second clamping jaw 24 to replace the bulges in pushed back position.

Figure 9:
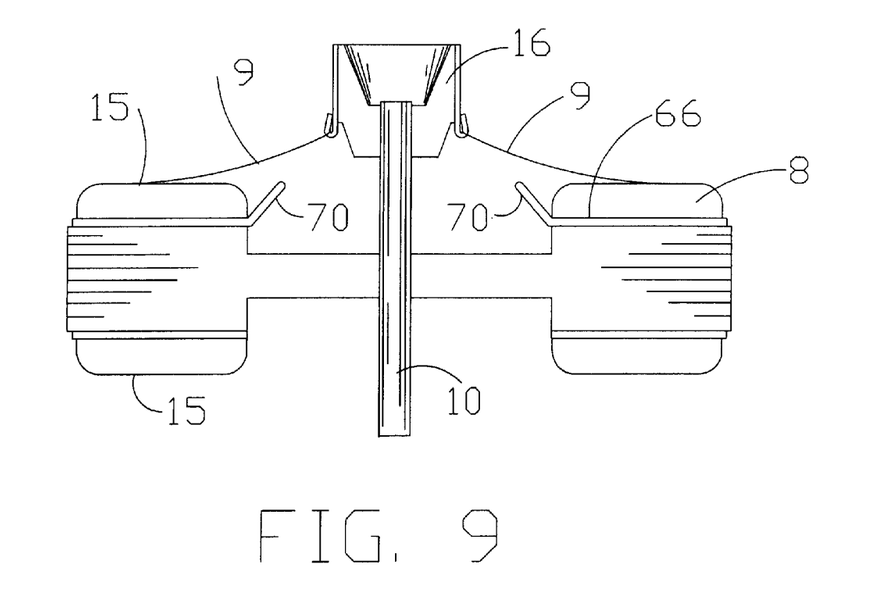
FIGS. 9 to 10 are views similar to FIGS. 2 and 3 showing a second refinement.
Figure 10:
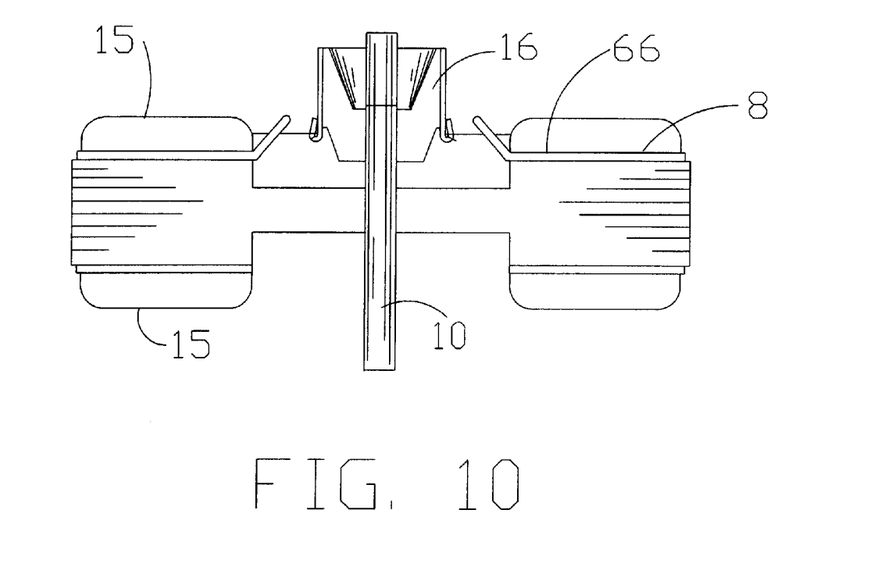
Figure 11:
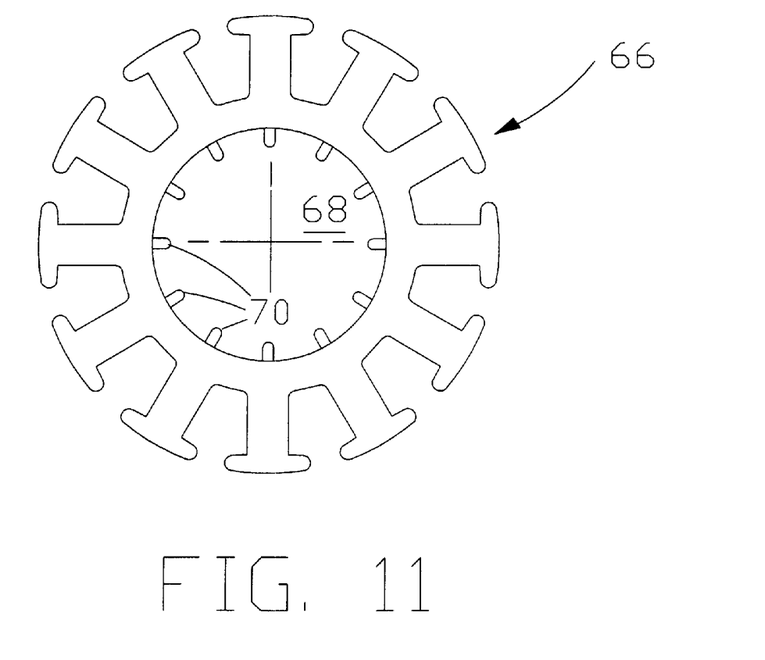
FIG. 11 is a plan view of a cheek used in the second refinement of FIGS. 9 and 10.

In the second refinement represented in FIGS. 9 to 11, the sheet metal pack comprises, as is well known, two insulating plates 66 made of plastics disposed at the ends of the sheet metal pack, parallel to the other sheets. Such plates are sometimes called "cheeks" or "stars" and have a slot identical to that of the other sheets, in particular a central circular opening 68 and recesses 67 for the passage of the strands of the winding.

In the present refinement, the cheek 66 intended to be the closest to the commutator 16 has a series of pins 70 extending from the edge of the central opening 68 whilst being regularly distributed around the axis of the plate. The pins 70 have an elongated rectilinear shape in the radial direction towards the axis and extending protruding from one face of the cheek. Said cheek is disposed in the sheet metal pack so that the pins 70 are orientated in the direction of the commutator 16 and in the opposite direction to the sheet metal pack. They thus have a shape like a truncated cone. The winding is produced so that the free end of each pin 70 extends roughly in the general plane of the corresponding axial end 15 of the winding.

During compression in the press, these pins 70 ensure the guidance of the strands 9 connected to the commutator 16, as described above. At the end of compression, bearing in mind the permanent position of the commutator 16, the pins 70 are situated placed radially between the commutator 16 on the one hand and the winding and the sheet metal pack on the other hand.

Figure 12:
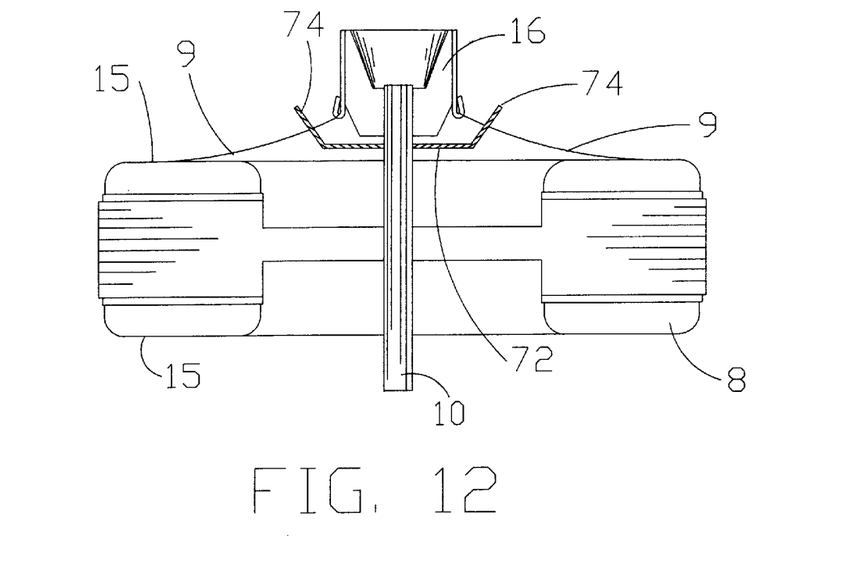
FIGS. 12 and 13 are views similar to FIGS. 2 and 3 showing a third refinement.
Figure 13:
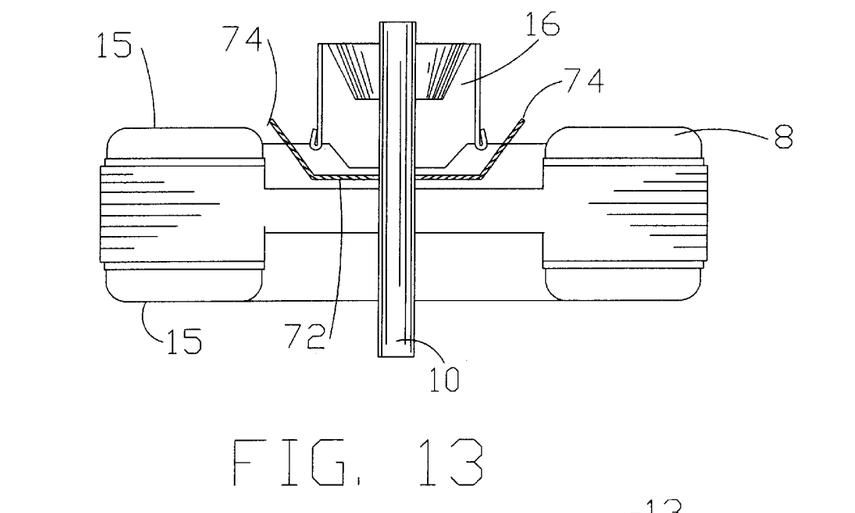

In the third refinement represented in FIGS. 12 and 13, the rotating part this time comprises a washer 72 made of plastic material, coaxial to the commutator 16 and attached thereto so that once the commutator is threaded onto the shaft, the washer 72 is placed in the axial direction between the commutator and the sheet metal pack. The washer 72, like the commutator 16, is threaded onto the shaft 10. The washer comprises a plane ring-shaped washer body, and pins 74 protruding from an outer circular circumference of the washer body and of a face of this body.

The pins 74 are elongated in a direction radial to the shaft and oriented in the opposite direction to the axis of the washer. The washer is disposed so that the pins 74 extend from the side of the commutator 16, the total diameter of the washer at the level of the pins being greater than the diameter of the commutator. During winding, the strands 9 adjacent to the commutator 16 are inserted between the pins 74.

During compression, the washer 72 is moved as a unit with the commutator 16. The pins 74 are responsible for guiding the above-mentioned strands 9 as described above.

Figure 14:
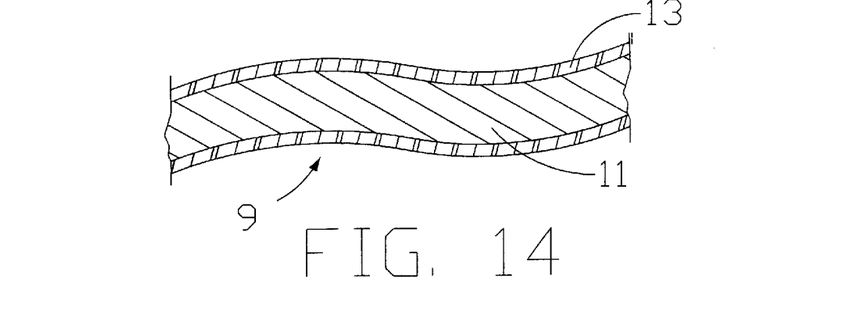
FIG. 14 is a partial view in longitudinal section of a strand of the motor of FIG. 1, according to a fourth refinement.

In the fourth refinement represented in FIG. 14, the sheath 13 of the strands is formed by a thermosetting and electrically insulating material. By thermosetting is understood, as is well known, a material having a certain flexibility in the unworked state and which, when it is heated to a temperature at least equal to a predetermined threshold characteristic of the material, becomes rigid, even after cooling.

In this refinement, during the compression stage, an electric current is circulated in the strands 9 by supplying the commutator 16 in a modified manner. This current is chosen so it has an intensity adequate to heat the winding by JOULE effect to a temperature equal to or greater than the hardening temperature of the material forming the sheath 13. The strands 9 are thus supplied until the polymerisation of the material is obtained, from which its hardening results.

From that time onwards the supply of the strands with electric current ceases, and the compression is stopped by opening the press. As the material of the sheathes 13 has hardened, no significant spring-back of the winding, in particular of the leading-out wires, is produced, along the axis 12 by the spring effect. The sheathes 13 keep the leading-out wires crushed in the compression position.

At the end of the method according to the invention in the above-mentioned embodiment and the refinements, the axial end faces 15 of the winding are plane and perpendicular to the axis 12. They may have cavities between certain crushed leading-out wires. As these faces are formed by the crushed leading-out wires, they have on the millimeter scale an irregular appearance caused by the strands 9 pressed against one another. The axial dimension of the winding has thus been reduced. Moreover, the tolerance range to be associated with this reduced dimension d' of the winding may itself be substantially reduced in relation to the range attached to the axial dimension d before compression. The reduction in the tolerance range will be, for example, equal to the reduction n the axial dimension, i.e. d–d'. The saving in space achieved will therefore be equal to the sum of the reduction in the axial dimension and the axial reduction in the tolerance range, i.e. 2×(d–d'). The saving in space is therefore equal to twice the axial reduction performed on the leading-out wires. This saving in space has repercussions on the position of the parts of the motor in FIG. 1 adjacent to the end faces 15 of the winding, and enables the axial dimension of the motor to be reduced.

Moreover, the crushing of the leading-out wires improves the volumetric distribution of the strands and of the leading-out wires in the sense of greater regularity.

The method according to the invention therefore enables the unbalanced mass of the rotating part to be further reduced.

Of course, numerous modifications could be made to the invention without departing from the scope thereof.

The strands 9 could be heated during compression without providing them with current, thanks to adapted heating means.

Moreover strands comprising a sheath made of a conventional insulating material could be used, and to the strands a hot liquid substance which sets on cooling, such as a resin or a lacquer, could be applied before the compression stage. Then the compression of the winding is performed as mentioned above, without heating the winding and the compression stage is prolonged until the substance cools. Once it has cooled and therefore hardened, compression is brought to an end. The armature will consequently comprise strands stuck to one another by means of this material applied to the strands.

The invention is applicable to rotating parts of electric machines such as alternating-current motors, alternators or dynamos.

The term "compression load" will be understood in the broad sense, as covering any stress on at least one axial end face of the winding in relation to the other face with a view to its crushing. In particular, the compression will be able to be progressive or abrupt.

The above-mentioned embodiment and the refinements could be advantageously combined with respect to their compatible characteristics.

What is claimed is:

1. A method for producing a wire-wound rotating part for an electrically drive machine comprising:

attaching a sheet metal pack and a commutator onto a shaft;

spacing the commutator from the sheet metal pack;

providing a plurality of conductive strands;

attaching an outer sheath of a thermosetting material to the conductive strands;

winding the conductive strands onto the sheet metal pack and the commutator to form a generally ring-shaped winding; and simultaneously compressing the winding in an axial direction of the winding, guiding the strands extending from the commutator to the winding, moving the commutator closer to the sheet metal pack and heating the winding to a temperature at least equal to a setting temperature of the material.

2. The method according to claim 1, wherein the guiding step further comprises the step of keeping each of the strand sections in a fixed radial plane relative to the shaft.

3. The method according to claim 1, wherein the heating step further comprises circulating electric current in the strands.

4. The method for producing a wire-wound rotating part of claim 1, wherein the compressing step comprises the moving step.

5. A method for producing a wire-wound rotating part for an electrically drive machine comprising:

attaching a sheet metal pack and a commutator onto a shaft;

spacing the commutator from the sheet metal pack;

winding a plurality of conductive strands onto the sheet metal pack and the commutator to form a generally ring-shaped winding; and simultaneously compressing the winding in an axial direction of the winding, guiding the strands extending from the commutator to an axial end face of the winding and moving the commutator closer to the sheet metal pack, wherein the compressing step further comprises applying to the strands a hot liquid substance being hardenable on cooling, and cooling said hot liquid substance until said substance hardens.

6. A wire-wound rotating part for an electrically driven machine, comprising:

a shaft extending along an axis;

a sheet metal pack;

a commutator attached to the shaft;

a generally ring-shaped winding comprising a plurality of conductive strands wound onto the sheet metal pack and the commutator;

at least one series of elongated pins disposed coaxially to the shaft, the pins extending axially away from the sheet metal pack and being placed between the commutator and the sheet metal pack in a radial direction perpendicular to the axis; and a washer threaded onto the shaft and adapted to bear the series of pins.

7. The rotating part according to claim 6, wherein the washer is disposed axially between the commutator and the winding.

8. The rotating part according to claim 6, wherein the washer is attached to the commutator.

9. The rotating part according to claim 6, wherein the sheet metal pack further comprises an insulating plate adapted to bear the series of pins.

10. The rotating part according to claim 6, wherein each strand comprises an outer sheath of thermosetting material.

11. The rotating part according to claim 6, wherein the strands are secured to one another.

12. The rotating part according to claim 6, wherein the winding has axial faces which are substantially planar and wherein the pins protrude from a face of the commutator, each pin having a free end that extends roughly in a general plane of a corresponding one of the axial faces of the winding.

13. The wire-wound rotating part of claim 6, wherein the elongated pins are disposed on the sheet metal pack.

14. The wire-wound rotating part of claim 6, wherein the elongated pins separate a plurality of sections of the strands extending from the commutator to the sheet metal pack.

* * * * *